(12) United States Patent
Günther et al.

(10) Patent No.: US 9,981,426 B2
(45) Date of Patent: May 29, 2018

(54) 3D PRINTING METHOD WITH RAPID DRYING STEP

(71) Applicant: Voxeljet AG, Friedberg (DE)

(72) Inventors: Daniel Günther, München (DE); Johannes Günther, Augsburg (DE)

(73) Assignee: VOXELJET AG, Friedberg (DE)

( * ) Notice: Subject to any disclaimer, the term of this patent is extended or adjusted under 35 U.S.C. 154(b) by 2 days.

(21) Appl. No.: 15/105,272

(22) PCT Filed: Dec. 9, 2014

(86) PCT No.: PCT/DE2014/000624
§ 371 (c)(1),
(2) Date: Jun. 16, 2016

(87) PCT Pub. No.: WO2015/090265
PCT Pub. Date: Jun. 25, 2015

(65) Prior Publication Data
US 2016/0311167 A1    Oct. 27, 2016

(30) Foreign Application Priority Data
Dec. 18, 2013   (DE) .......................... 10 2013 021 091

(51) Int. Cl.
*B29C 64/165* (2017.01)
*B29C 64/20* (2017.01)
(Continued)

(52) U.S. Cl.
CPC .......... *B29C 67/0085* (2013.01); *B22F 3/008* (2013.01); *B28B 1/001* (2013.01);
(Continued)

(58) Field of Classification Search
None
See application file for complete search history.

(56) References Cited

U.S. PATENT DOCUMENTS

| 8,741,194 B1 | 6/2014 | Ederer et al. |
| 2004/0026418 A1 | 2/2004 | Ederer et al. |

(Continued)

FOREIGN PATENT DOCUMENTS

| DE | 102011053205 A1 | 3/2013 |
| EP | 0431924 B1 | 1/1996 |

(Continued)

OTHER PUBLICATIONS

International Search Report, Application No. PCT/DE2014/000624, dated Apr. 29, 2015.

(Continued)

*Primary Examiner* — Mary Lynn F Theisen
(74) *Attorney, Agent, or Firm* — The Dobrusin Law Firm, P.C.

(57) ABSTRACT

The invention relates to a method for producing three-dimensional models by means of a layering technique, particulate build material being applied to a build space in a layer, and a binder fluid then being selectively applied to the build material, proceeding in layers, and these steps being repeated until the desired model is produced, a controlled air flow being conducted through the applied build material, as well as a device for carrying out the method and thus produced models.

22 Claims, 10 Drawing Sheets

(51) Int. Cl.
- B33Y 10/00 (2015.01)
- B33Y 30/00 (2015.01)
- B29C 67/00 (2017.01)
- B22F 3/00 (2006.01)
- B28B 1/00 (2006.01)
- B22F 3/105 (2006.01)

(52) U.S. Cl.
CPC ............ *B29C 64/165* (2017.08); *B29C 64/20* (2017.08); *B33Y 10/00* (2014.12); *B33Y 30/00* (2014.12); *B22F 2003/1056* (2013.01); *B22F 2201/50* (2013.01); *Y02P 10/295* (2015.11)

(56) References Cited

U.S. PATENT DOCUMENTS

| | | |
|---|---|---|
| 2004/0035542 A1 | 2/2004 | Ederer et al. |
| 2004/0170765 A1 | 9/2004 | Ederer et al. |
| 2005/0017394 A1 | 1/2005 | Hochsmann et al. |
| 2005/0167872 A1 | 8/2005 | Ederer et al. |
| 2006/0105102 A1 | 5/2006 | Hochsmann et al. |
| 2006/0108090 A1 | 5/2006 | Ederer et al. |
| 2006/0176346 A1 | 8/2006 | Ederer et al. |
| 2006/0237159 A1 | 10/2006 | Hochsmann |
| 2007/0126157 A1 | 6/2007 | Bredt |
| 2008/0001331 A1 | 1/2008 | Ederer |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0260945 A1 | 10/2008 | Ederer et al. |
| 2009/0261497 A1 | 10/2009 | Ederer et al. |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0272519 A1 | 10/2010 | Ederer et al. |
| 2010/0291314 A1 | 11/2010 | Kashani-Shirazi |
| 2011/0223437 A1 | 9/2011 | Ederer et al. |
| 2011/0308755 A1 | 12/2011 | Hochsmann |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0202381 A1 | 7/2014 | Ederer et al. |
| 2014/0212677 A1 | 7/2014 | Gnuchtel et al. |
| 2014/0227123 A1 | 8/2014 | Gunster |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0246485 A1* | 9/2015 | Guenster ............... B22F 3/1055 264/511 |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |

FOREIGN PATENT DOCUMENTS

| | | |
|---|---|---|
| EP | 2261009 A1 | 12/2010 |
| WO | 98/28124 A2 | 7/1998 |
| WO | 2005/097476 A2 | 10/2005 |

OTHER PUBLICATIONS

Written Opinion of the International Search Authority, Application No. PCT/DE2014/000624, dated Apr. 29, 2015.

* cited by examiner

3D PRINTING METHOD WITH RAPID DRYING STEP

CLAIM OF PRIORITY

This application is a national phase filing under 35 USC § 371 from PCT Application serial number PCT/DE2014/000624 filed on Dec. 9, 2014, and claims priority therefrom. This application further claims priority from German Patent Application DE 10 2013 021 091.7 filed on Dec. 18, 2013. PCT Application Number PCT/DE2014/000624 and German Patent Application Number DE 10 2013 021 091.7 are each incorporated herein in their entireties by reference.

The invention relates to a method and a device for producing three-dimensional models, using a controlled air flow, as well as models produced therewith.

A method for producing three-dimensional objects (models, components, 3D molded parts) from computer data is described in the European patent specification EP 0 431 924 B1. In this method, a particulate material is applied in a thin layer to a platform, and a binder material is selectively printed thereon, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is reached. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which powder deposits are removed, for example by manual brushing.

Of all the layering techniques, 3D printing based on powdered materials and the supply of liquid binder is the fastest method.

This method may be used to process different particulate materials, including natural biological raw materials, polymers, metals, ceramics and sands (not an exhaustive list).

For example, a solid in the particulate material (build material) or in a binder fluid (solvent) may be used as the binding system or binder. The solid is dissolved by means of a solvent expelled from the ink-jet print head (also referred to below as the binder fluid), or the binder fluid, including a solid, is selectively applied. After the solvent (binder fluid) evaporates, the particles stick together in the desired locations and thus form a component in the build material. The component may be removed from the remaining loose particulate material after a certain waiting period.

This waiting period is generally long, since the solvent is only slowly released from the dissolved material. In addition, the vapor pressure of the solvent must be relatively low, since it will otherwise not be possible to print using an ink-jet print head.

The particular waiting times depend to a great extent on the distance that the liquid vapor travels in the applied build material from the component to the surface of the build material (surface of the powder cake). The machine dimensions are crucial in this regard. The drying time, i.e., the time it takes for the solvent to escape from the build material, develops non-linearly as the distance increases. In very large build spaces, the parts may not dry within a finite period of time.

This results in the disadvantage that, despite the long waiting times, the components are often unstable after unpacking and have a certain plasticity. The evaporation of the solvent also produces a certain deposit buildup on the component, which must be removed manually after unpacking.

The solvent for the aforementioned printing process should generally have a relatively low vapor pressure. Higher vapor pressures, which are, however, desirable for the drying process, impair the ink-jet print head's ability to generate droplets.

Additives in the solvent are also an obstacle to the drying process, since they significantly influence the evaporation rate. It is therefore often impossible to adjust the viscosity of the solvent for the ink-jet printing process.

One way to shorten the long waiting times prior to unpacking the parts is to use binding systems that offer a sufficient strength despite incomplete drying. However, this procedure represents a significant limitation with respect to the material system. Only a small group of materials meet this criterion.

Another option is to use a system that chemically results in a solidification of the printed fluid and thereby causes a binding of the particles. If possible the system components are kept separate in the system. The desired solidification reaction does not occur until the printing process. One example of a system of this type may be a method known as the cold resin process. An acid-encased sand is brought into contact with furfuryl alcohol. This results in a chemical reaction which causes the previously liquid components to be converted to a cross-linked plastic.

These systems significantly reduce the waiting time prior to unpacking the parts. The monomers used nevertheless present a danger to the print head. The monomers for processes of this type often have an aggressiveness that is comparable to that of solvents. The more or less latent cross-linked plastics pose a permanent risk to the print head, since they may solidify at any time, due to contaminants or undesirable catalysis reactions, and thus damage the print head.

The approaches described for shortening the waiting time during the method process thus have various disadvantages and problems.

There has thus long been the need to provide a 3D printing method in which the waiting times for removal or drying may be reduced, and a faster manufacturing process may thus be achieved.

The need also exists to simplify the unpacking process and thus to speed up model production, by avoiding additional operations, such as the manual removal of deposits on the component.

The produced model should furthermore be so stable that it is easy to unpack, and the unpacking process is not hindered or slowed down by a plastic or excessively plastic model (component), nor are quality disadvantageous produced thereby.

One object of the present invention is thus to eliminate the conflict between the short drying time of the components after the overall build process and the printability of the binder fluid with the aid of an ink-jet print head.

One object of the present invention is also to provide a 3D printing method, by means of which the drying times of the binder fluid may be shortened, and a higher method speed may thus be achieved.

Another object of the present invention is to at least partially or entirely avoid the disadvantages of the prior art.

DETAILED DESCRIPTION OF THE INVENTION

A number of terms in the invention are explained in greater detail below.

Within the meaning of the invention, "3D printing method" relates to all methods known from the prior art which facilitate the construction of components in three-dimensional molds and are compatible with the described method components and devices. In particular, these are powder-based methods, the methods described below being preferred.

Within the meaning of the invention, "selective binder application" or "selective binder system application" or "binder fluid application" or "application of the binder fluid" may take place after each particulate material application or irregularly, depending on the requirements of the molded body and for the purpose of optimizing the production of the molded body, i.e., non-linearly and not in parallel after each particulate material application. "Selective binder application" or "selective binder system application" may thus be set individually and during the course of producing the molded body.

"Binder system" is understood to be a material system that is able to bind the particulate material. The binder system comprises at least one "binder fluid" to be printed and possibly other liquid or solid components, which may be present in the binder fluid as well as in the particulate material. The binder system may bind chemically or physically or by means of a combination of a chemical and physical process. The binding action may be triggered or accelerated by adding energy, e.g., in the form of heat or light. In general, all material systems known to those skilled in the art in this connection may be considered as the binder system. For example, a binder system may include a "binder fluid" and a "solid binder," which is contained in the particulate material (build material) and is soluble in the binder fluid. In this case, the solid is dissolved by the solvent, which is expelled from the ink-jet print head and applied to the particulate material. After the essential evaporation or drying of the binder fluid, the selectively printed areas of the build material are bound together. A selective solidification may likewise be produced in the binder fluid and/or the particulate material with the aid of chemical systems known to those skilled in the art.

"Molded body," "model," "3D molded part" or "component" within the meaning of the invention are all three-dimensional objects that are produced with the aid of the method according to the invention and/or the device according to the invention and which have a nondeformability.

Any known 3D printing device that contains the necessary components may be used as the "device" for carrying out the method according to the invention. Common components include a coater, a build space, a means for moving the build space or other components, a dosing device, a print head, a heat means, a positioning means for batch processes or continuous processes and other components which are known to those skilled in the art and therefore do not need to be listed in greater detail here.

All materials known for powder-based 3D printing, in particular sands, ceramic powders, metal powders, plastics, wood particles, fibrous materials, celluloses and/or lactose powders, may be used as "particulate materials" or as "build materials." The particulate material is preferably a dry, free-flowing powder, although a cohesive, firm powder may also be used.

"Build space" within the meaning of the invention is the geometric place in which the particulate material feedstock grows during the build process by repeated coating with particulate material. The build space is generally delimited by a base, the building platform, by walls and an open cover surface, the build plane. The build plane may be horizontal but also form an angle, for example in continuous methods, so that the layer application takes place obliquely at an angle.

A "build container" within the meaning of the invention implements a build space. As a result, it has a base, walls and an open access area, the build plane. The build container always includes parts which do not move relative to the frame of the 3D printing device. Removable build containers, so-called job boxes, make it possible to operate the machine more or less continuously, since the job box may be inserted into and removed from the machine. The parts in a first build operation may thus be unpacked outside the 3D printing device, while new parts may be printed within the machine in a second build container.

According to the invention, the "printing and coater plane" is the abstraction of the location of the building process currently in progress. Since the dosing unit and the coater are structurally moved in the device on a positioning unit with shared components at nearly one height, the "printing and coater plane" is viewed in this description as being situated at the upper edge of a newly applied layer. It may form a horizontal plane or be disposed at an angle.

According to the invention, a "building platform" moves relative to the printing and coater plane. This relative movement takes place during the building process in interrupted movements in the layer thickness. It defines the layer thickness.

"Container wall" or "wall" designates a barrier to the particulate material. The particulate material is unable to travel from one side of the wall to the other.

In this publication, a "seal" designates two structural elements which prevent a passage of the particulate material through contact points between walls moving relative to each other or between walls and the building platform.

"Vapor channel" designates the abstract representation of a flow pipe in the build material. This term is used in connection with lengths. In reality, the air gap in a powder feedstock of the build material represents a geometrically complex, connected space.

The "geometric component limit" designates an abstraction of a component in the build material. The part produced during the build process deviates from the geometric component limit, due to the discrete nature of the build material particles.

"Forced ventilation" designates a central variant of the invention, which is achieved through a controlled air flow. The free convection in the build material is, in a sense, the opposite of forced ventilation. In this case, vapors may be removed only through diffusion, due to concentration gradients. In the case of forced ventilation, the vapors, i.e. the solvent vapors or binder fluid vapors, are controlled by an air flow and selectively moved or removed from the build material.

The "retention system" is located at the interface between the ventilation system and the particulate material feedstock. Its function is to trap the particles present in the air flow. It may be designed as a screen mesh or as a porous body. 3D-printed bodies may also be used as a retention system. It is immaterial whether they have already been completely dried. Bodies of this type may also be produced with the building process.

A "controlled air flow" within the meaning of the invention is an air flow, which is conducted through the build material in a defined manner or, in any case, is purposefully introduced into the applied build material from the outside and flows through the applied build material for the purpose of more quickly removing the solvent vapors (binder fluid vapors). This reduces or essentially dries the binder fluid in the applied build material. The "controlled air flow" may be simple ambient air, which is preferably temperature-controlled, preferably heated, or it may be a defined gas mixture.

"Reduced or essentially dried" with regard to the binder fluid means that the quantity of binder fluid is reduced during the selective application, compared to the direct application of binder fluid. The binder fluid is preferably reduced to the extent that the produced component has a strength that makes it stable to the extent that it may be unpacked easily and without problems. "Essentially dried" means that the component does not contain any binder fluid or only remnants thereof. According to the invention, the process of "reducing" or "drying" the binder fluid is advantageously accelerated and purposefully controlled with the aid of a "controlled air flow" with regard to the time and quantity of the binder fluid reduction.

"Proceed layer by layer" within the meaning of the invention designates the process of lowering the build space by the thickness of one layer or raising device parts located above the build space by the thickness of one layer in a job box or in another horizontal build plane. In a continuous method, "proceed layer by layer" designates the moving of the applied build material (the build material block in the print machine) by the thickness of one layer, so that a new layer of particulate material may be applied and a layer application and selective binder fluid application may thus take place continuously.

"Flow through in a time-controlled manner" within the meaning of the invention means that the controlled air flow during the method is carried out at a defined point in time and over a defined period of time, and the controlled air flow may take place regularly or irregularly during the method.

The invention and its preferred specific embodiments are described in greater detail below.

In particular, the invention relates to a method for producing three-dimensional models, preferably porous models, by means of a layering technique, particulate build material being applied in a layer onto a build space, and then a binder fluid being selectively applied to the build material, proceeding layer by layer, and these steps being repeated until the desired model is produced, a controlled air flow being conducted through the applied build material. The constructed and/or obtained model is preferably porous.

The method according to the invention makes it advantageously possible to substantially reduce the process duration and thus significantly increase the economic feasibility of the printing method.

This is achieved by the fact that the binder fluid may be quickly removed with the aid of a controlled air flow, and the solvent is thus quickly reduced in the component and is preferably essentially dry. Not only is the drying time of the component advantageously reduced in this manner, but it is now possible to produce large components that were not practical to dry with conventional methods and were thus difficult or even impossible to produce using 3D methods.

It was surprising that an air flow may be conducted through the applied build material without causing turbulence or instability in the powder material and without disadvantageously influencing the reproduction accuracy of the printing process. It has surprisingly been shown that the method according to the invention not only makes it possible to significantly reduce the method duration but also to avoid negatively influencing the components in good quality and to produce high-quality 3D components.

All binder fluids suitable for the method may be used in the method, and the boiling point of the binder fluid is selected in such a way that it advantageously interacts with the other material components. The boiling point of the binder fluid is preferably below or above that of distilled water.

The controlled air flow is designed and conducted through the applied build material in such a way that the binder fluid is advantageously removed from the build material. The intensity of the air flow is suitably adapted to the other method conditions and the material used. The controlled air flow will preferably flow through the build material applied to the build space during or after the application of the layers. It is furthermore preferred that the controlled air flow discontinuously or continuously flows through the build material applied to the build space and preferably flows in a time-controlled manner through the build material applied to the build space.

Depending on the requirements and other method conditions and the materials used, the controlled air flow flows through essentially the entire volume of the build material applied to the build space and preferably flows through the build material in selected areas and more preferably flows through the build material in the area of the upper build material layers.

The controlled air flow is preferably heated before entering the build material.

The controlled air flow is preferably produced by means of overpressure or underpressure.

Air inlets are preferably introduced into the build material.

The controlled air flow is suitably conducted through the applied build material for the purpose of preferably causing an advantageous removal of the binder fluid vapors and reducing the solvent in the component or essentially drying it out. The controlled air flow preferably flows through the build material in the direction of gravity, counter to the direction of gravity and/or at a certain angle to the direction of gravity.

All possible combinations of the direction and control of the controlled air flow are possible, the direction of the controlled air flow preferably being changed during the method.

The device for carrying out the method according to the invention includes all necessary basic device means, such as a building platform, coater, printing unit, positioning unit, etc. The device according to the present invention for producing three-dimensional models by means of a layering technique preferably has one or multiple means for generating a controlled air flow in the build material. The air flow is preferably produced in the device via an overpressure or underpressure, with the aid of one or multiple means.

The device is furthermore designed in such a way that build material is not removed from the build space by the controlled air flow. The device preferably has a retention system, which preferably has smaller or larger effective pores than the average grain diameter of the particulate material. Any means that is suitable for this purpose may be used; preferably the material of the retention system is a screen mesh, a filter structure, an open-pore sintered material and/or a porous material.

The controlled air flow is introduced into the build container or the build space in a suitable structural manner and guided in such a way that this air flow is also able to escape and thereby remove binder fluid vapors. Means for the controlled air flow are preferably mounted in or on the device, above, below or on the side of the build container. The device preferably has at least two at least partially air-permeable walls in the build container and/or an at least partially air-permeable base and preferably at least one flow channel system, or the latter is mounted on the side of the build space.

In one preferred specific embodiment, the device is characterized in that the at least partially air-permeable base and/or at least one of the at least partially air-permeable walls is/are in contact with the means for generating the controlled air flow via an air flow means, preferably a pipe.

In another preferred specific embodiment, the device is characterized in that the build material is in contact via a plate, which is provided with an air flow means and is placed on the build material.

The controlled air flow is generated by means of units known to those skilled in the art. The device preferably has one or multiple means for generating a controlled air flow.

In addition, the flow directions and flow intensity of the means for generating a controlled air flow are preferably controllable.

The invention furthermore relates to models which were produced with the aid of the method according to the invention.

The object of the invention is thus achieved by the fact that the drying or evaporation is physically accelerated by removing solvent vapor (binder fluid vapor) from the powder cake of the build material. This approach then makes it possible to adapt the liquid binder fluid to the printing task.

As a result, both the performance of the printing method may be increased and the quality of the components may be improved.

Additional preferred specific embodiments of the invention are illustrated below.

A system is essentially used for building models in layers with the aid of ink-jet printing. The sequence according to the prior art is as follows: a layer of powder is applied to a building platform and leveled. A fluid, i.e., a binder fluid, is then printed onto the layer according to the layer data of the 3D model. The printed areas change one or multiple properties (strength, water solubility, etc.). The material often solidifies due to a binding component in the liquid binder (e.g., an adhesive). Binders in the form of powder components are also typical. After the printing process, the building platform is lowered, and the process begins all over again.

These steps are repeated until the component is completely present in the built powder cake of the build material.

As described above, a liquid is selectively applied to the build space. The piezo print heads used for this purpose impose special requirements on the printing fluid. First of all, the viscosity of the liquid is an important variable. Excessively high viscosities cause a great deal of energy to be consumed in producing the individual droplets, due to high friction in the nozzle. Starting at a limit viscosity of approximately 20 mPas, no more droplets may be formed. An excessively low viscosity causes insufficient evaporation of the system. The droplet formation is also impaired, and reliable printing is not possible.

Another important parameter is the vapor pressure in the liquid. If the vapor pressure is too high, vapor bubbles, which prevent droplets from forming, may be generated during the droplet formation phase, in which a phase of underpressure acting upon the print fluid occurs.

The third parameter is the surface tension. It represents a variable which acts directly upon the necessary droplet formation energy. If the surface tension is too high, no droplets are able to form.

The print fluid is generally optimized for two variables: for droplet formation and for the component to be produced. Target conflicts generally occur, as described above.

Multiple variables are characteristic for the build process of the component to be produced: The speed of the binding action determines the processability. If the liquid is too fast, it rolls off previously printed layers, due to bending torques. Since parts of the component are situated above the current coater plane, the components are pushed or carried along.

The viscosity of the liquid itself is important to the build process only if a substantial portion of binding agent is contained in the liquid binder, and if the liquid does not increase its viscosity due to the dissolution of a powder component. In systems of this type, a diffusion of the binder in areas that are not to be solidified may be slowed down only by means of an increased viscosity. This diffusion may be stopped only by drying.

In most processes, however, the vapor pressure is extremely important. Only part of the solvent is able to escape during the printing process. This is desirable to a certain extent so that the effect of the solvent may be delayed for the purpose of preventing the aforementioned process impairments. As a result, a substantial portion of the solvent must dry out of the component after the process.

Due the vapor pressure of the solvent, a saturated atmosphere quickly arises during the layer-by-layer component construction, due to this evaporation process. This atmosphere must escape via long and narrow channels in the powder.

Part of the solvent mass settles on the powder surrounding the component. As a result, deposits of poorly bound powder stick to the component and must be removed after the building process.

The object of the invention, on which the application is based, is the idea of moving this saturated atmosphere through the powder of the build material faster than is possible by means of natural convection, using a controlled air flow.

The acceleration of the existing system may be viewed as the first useful effect. The point in time at which the produced components may be safely unpacked is reached much earlier. This represents an economic advantage, since the lead times of additively manufactured components are crucial to market acceptance and price.

The use of a method and device according to the invention also makes it possible to vary the process chemistry. For example, systems having low evaporation rates may be used. The acceleration due to the device and method according to the invention then facilitate acceptable process times. Other advantages are protection of the print head, higher quality components and a broader variety of materials.

The application of an underpressure for generating the controlled air flow is preferred. The arrangement of the powder advantageously remains stable. A low yet stable air flow through the powder may be implemented.

In principle, however, an overpressure in the powder may also be applied. Nevertheless, this makes it more difficult to achieve a safe process execution. Due to the nature of the particulate material, the application of overpressure creates channels in the powder, which carry the entire air flow. The powder is carried along in the channels, due to the high flow velocities. Even the most sensitive settings for the overpressure do not provide a stable process window The controlled air flow, preferably the underpressure, is introduced into the powder via a filter element. The powder accumulates here. For example, if the baseplate of the build container comprises a filter structure, the powder is not deformed upon the application of a moderate underpressure.

It was surprisingly determined in additional experiments that the deposits on the component due to the device according to the invention occur depending on the direction. In the case of conventional devices, on the other hand, these deposits occur spherically around the component.

It has therefore proven to be advantageous to control the air flow in terms of its direction. For example, the direction of the flow may be situated counter to the direction of gravity.

It is furthermore advantageous to reverse the flow direction during the drying process. The reaction times of the solvent are therefore short and the deposit buildups are consequently low.

EXEMPLARY EMBODIMENT

The preferred specific embodiments of the device and the method described below contain features that are understood not only in the context described below. Instead, the features of the device and the method described below may be combined with the features of the invention already described above, and these features represent other preferred method variants as well as device variants in any combination of features with the features discussed above.

The system according to the invention draws heavily on powder-based 3D printing. The mechanical engineering is augmented to meet the requirements according to the invention.

Figure 1:
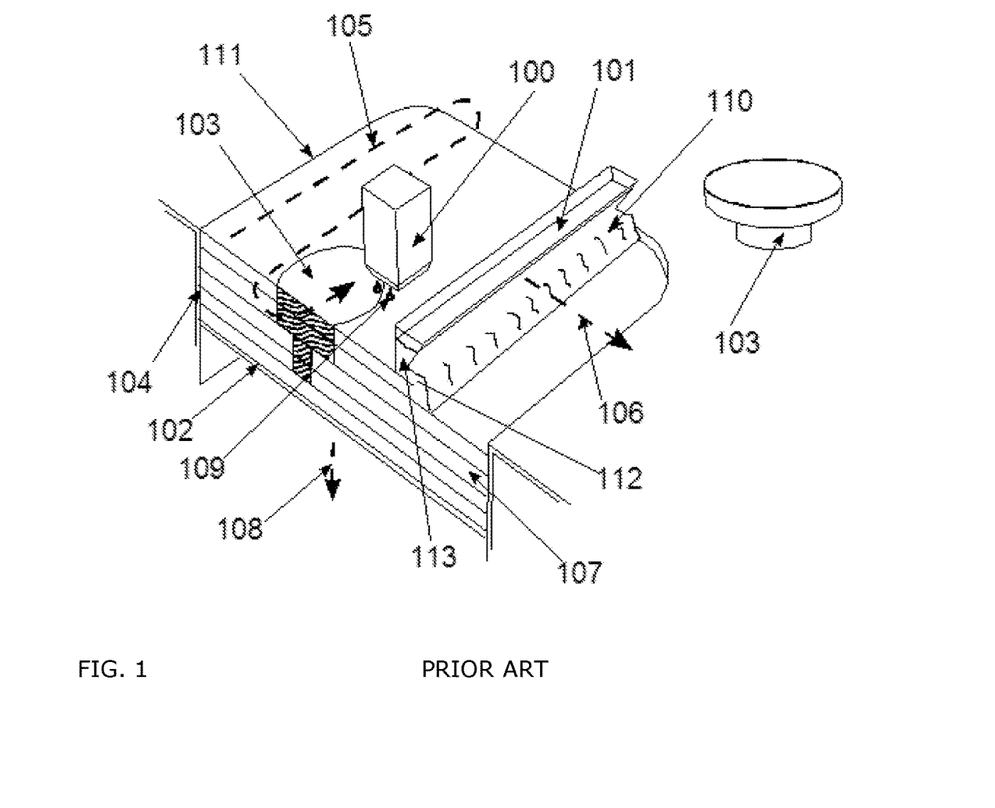
FIG. 1: shows a schematic representation of the components of a powder-based 3D printer as a sectional isometric view.
Figure 2:
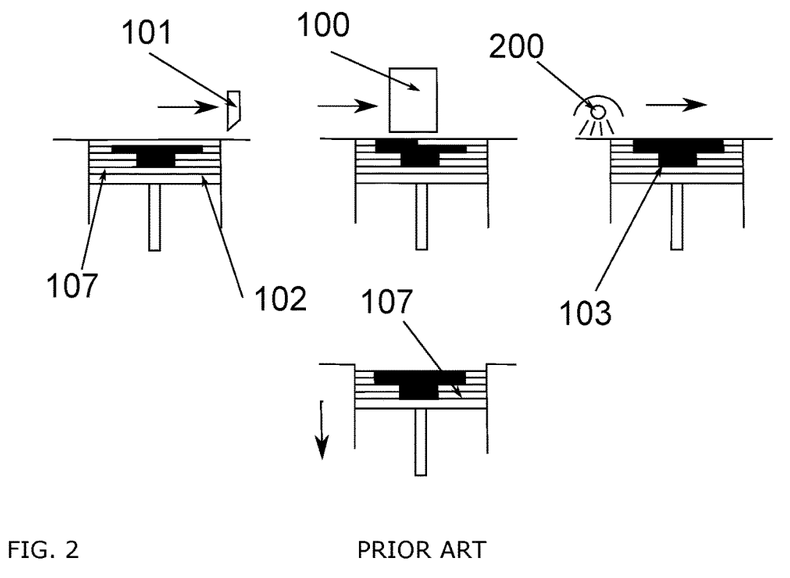
FIG. 2: shows a diagram of the sequence of a conventional 3D printing process.

The device according to the invention includes a powder coater (101). Particulate material is applied thereby to a building platform (102) and smoothed (FIG. 2(a)). The applied particulate material may comprise a wide range of materials. For example, sands, ceramic powders, metal powders, plastic, wood particles, fibrous materials, celluloses, lactose powders, etc. may be used. The flow characteristics of these materials may vary enormously. Different coater techniques permit layering from dry, free-flowing powders and cohesive, firm powders to fluid-based dispersions. The height of powder layers (107) is determined by building platform (102). It is lowered after one layer has been applied. During the next coating operation, the resulting volume is filled and the excess smoothed. The result is a nearly perfectly parallel and smooth layer of a defined height.

After a coating process, a liquid is printed on the layer with the aid of an ink jet print head (100) (FIG. 2(b)). The print image corresponds to the section of the component at the present build height of the device. The fluid strikes and slowly diffuses into the particulate material.

After the binder is printed, the layer may be optionally heated (FIG. 2(c)). For example, an IR emitter (200) may be passed over the build space for this purpose. This IR emitter may be coupled with the axis of the coating system. Part of the liquid binding agent is evaporated during this heating process. In the case of liquids that present a fire hazard, the evaporating material is extracted immediately.

At the end of this optional heating process, building platform (102) is lowered by the thickness of one layer. The steps of layer construction, printing, heating and lowering are now repeated until desired component (103) is completely produced.

Component (103) is now complete, and it is located in the powder cake (602). Depending on the physical or chemical process on which the binding of particles (303) is based, the component is now more or less solidified. The component is usually in a soft state directly after printing.

This state is nota problem as long as component (103) remains in powder (602). However, once the component is unpacked from the powder, a geometric deformation is unavoidable, due to gravity and other effects of force.

Figure 3:
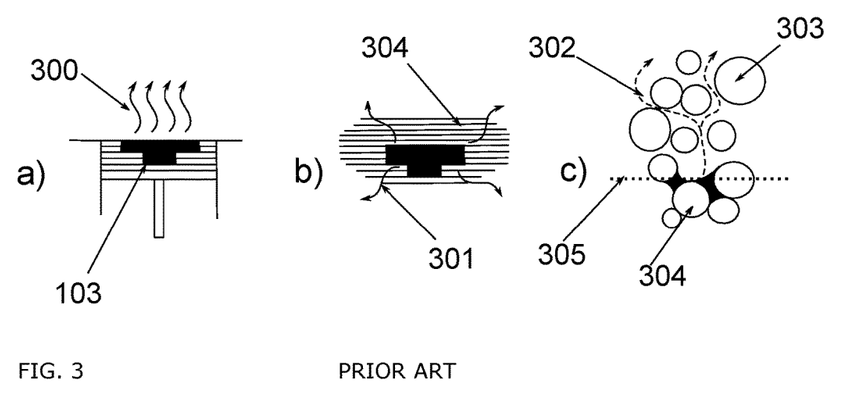
FIG. 3: shows an illustration of the drying process.

The component is therefore typically left in the powder, such as illustrated in FIG. 3. Excess binding agent (301), which does not allow component (103) to solidify, now evaporates via various vapor channels (302) in unbound particulate material (303). The bonds of bound particulate material (304) in geometric component limit (305) solidify more and more. After a certain waiting time, body (103) is sufficiently solid to be able to be unpacked.

The length of vapor channel (302), together with the vapor pressure of material (301), determines the drying speed. Parts located deep in particulate material (303) often dry only within economically unjustifiable periods of time.

Figure 4:
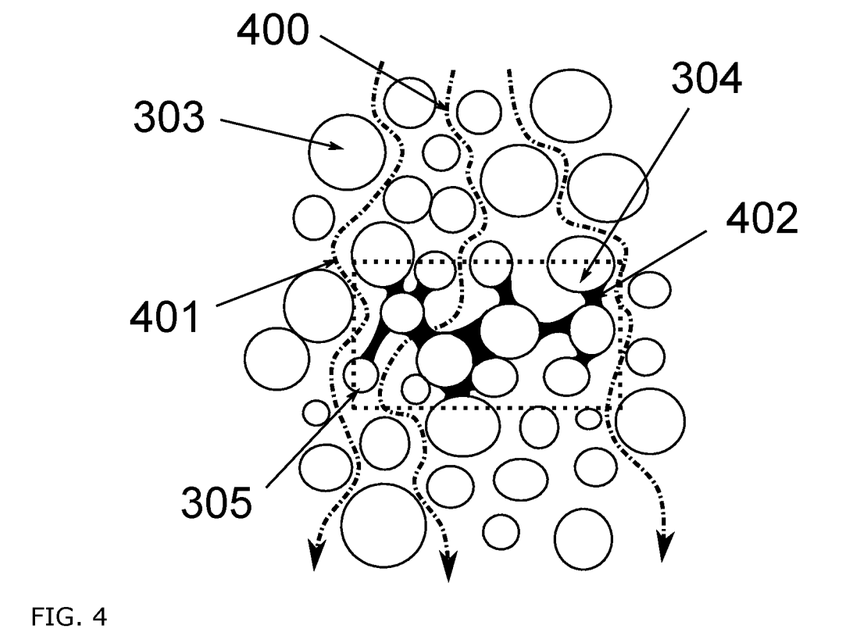
FIG. 4: shows the drying process using forced convection.

If porous components are being produced, the drying times may be reduced by a forced convection according to the invention, such as illustrated in FIG. 4. A pressure difference is applied to the particulate material for this purpose. Air flows, which may again be referred to as channels, are formed. They pass through geometric component (400) and outside geometric component (401). Liquid binder (402) evaporates into the surrounding space. Flows (400, 401) take up the binder and conduct it out of feedstock (602) according to the invention.

This drying effect may be amplified if heated air is conducted through feedstock (602).

Tests using overpressure for driving the flow show that this procedure is not well suited to a forced ventilation of the feedstock. Even at sensitive pressure settings, channels (similar to 302) form, which result in an outflow of the particulate material at the free end, due to the overpressure. The flow resistance decreases and the effect intensifies automatically thereby. Underpressure is preferred for the method according to the invention.

Figure 5:
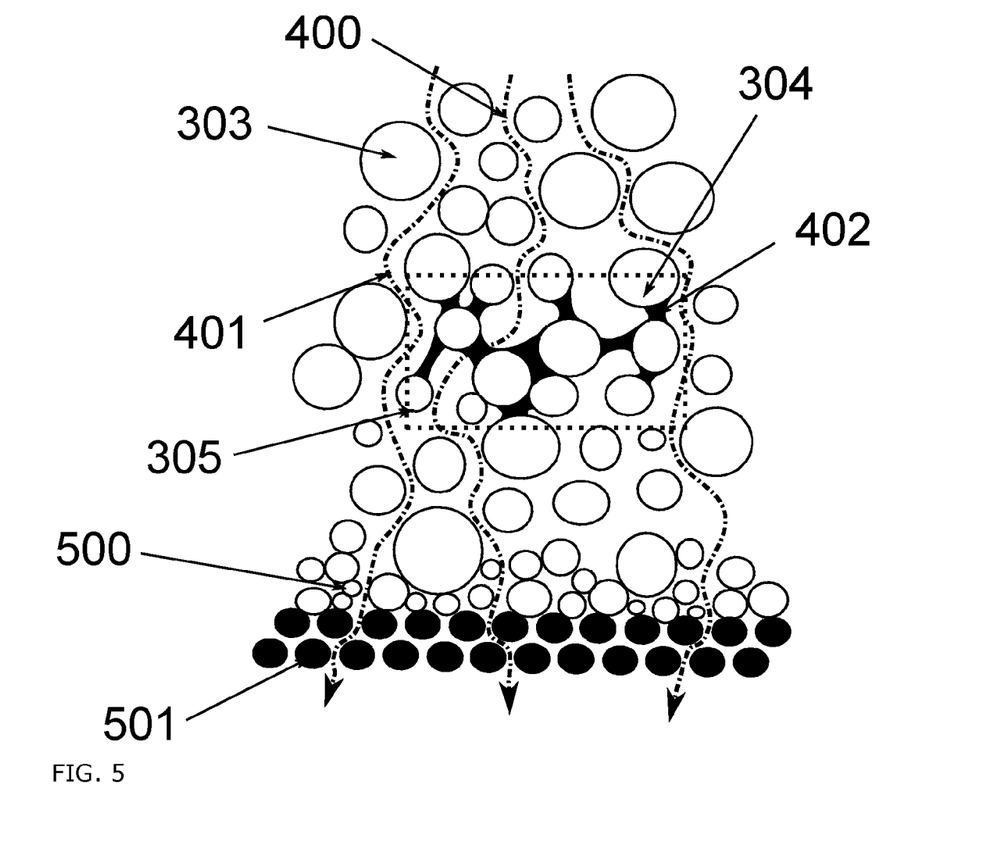
FIG. 5: shows contact elements.

Since particles of feedstock (602) may be carried along in air flow (400, 401), even if underpressure is used (such as illustrated in FIG. 5), a retention system (501) must separate the flow outside and inside feedstock (602). According to the invention, the retention system may be designed, for example, as a sieve. The mesh size must be adapted to the particle diameters in powder (303).

This retention system may also be applied to the use of overpressure. Retention system (501) must be designed in such a way that the channel formation described above is reliably prevented.

Smaller particles may normally escape through retention system (501). However, particulate material (500) in front of retention system (501) forms a filter system which traps smaller particles.

Porous materials are also generally suitable as retention system (501). They may be, for example, textile fabrics. Felted fibers are also suitable. Sintered bodies or similar structures, which are made of particles, also demonstrate good properties in the test.

Molded bodies produced with the aid of 3D printing methods or other particle-based additive manufacturing methods may also be used. Surprisingly, the particulate material itself is suitable as build material, which is to be retained afterward.

The forced ventilation, i.e., controlled air flow, may take place from different locations. On the one hand, it may take place from the outside. On the other hand, however, an inner ventilation may take place.

One way according to the invention is to carry out the ventilation via the base of the build container—i.e., building platform (103). A retention system (501) is inserted into the base for this purpose. A connecting piece is mounted on the underside of building platform (103). Since the building platform is generally movable, the connecting piece is connected to a hose which has an underpressure source.

The underpressure source may be, for example, a vacuum device. An adjustable secondary air system must be attached to the hose. The pressure difference over feedstock (602) may thus be precisely regulated. The particulate material and the height of the feedstock are crucial variables.

It is likewise possible to select a different extraction system. Any electrical blower or pneumatic suction system may also be used. Only moderate pressures are necessary.

Figure 6:
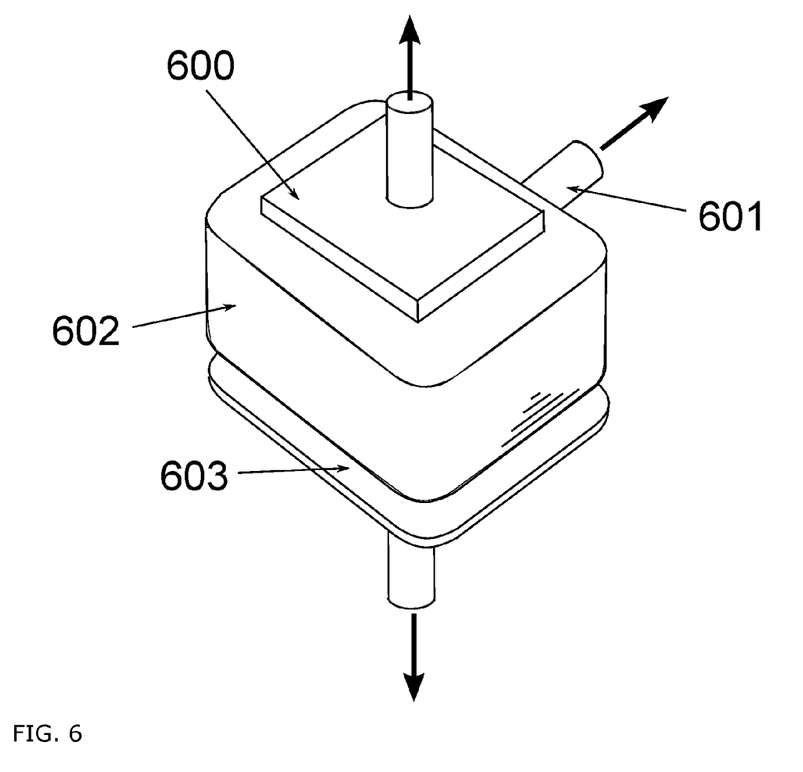
FIG. 6: shows installation locations for air conducting elements.

Feedstock (602) may furthermore be forced-ventilated via walls (601) of the build container, such as illustrated in FIG. 6. The retention system must have a very smooth design so that build platform (103) generally slides along this surface via its seal. For example, smoothed sintered metal plates may be used for this purpose.

To ventilate the feedstock via the cover surface, a "contacting device" must be placed on feedstock (602) after the building process. This contacting device, in turn, contains a retention system (501) and a connecting piece. Building platform (102) must have an air-permeable design for the inflow of the air.

Figure 7:
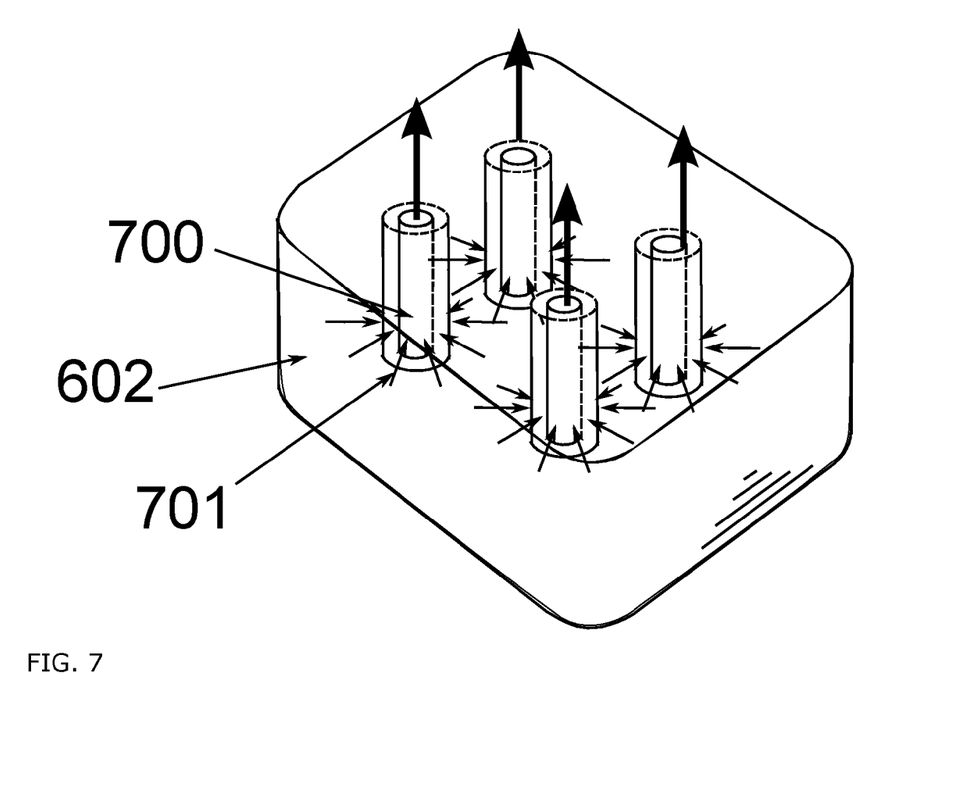
FIG. 7: shows air conducting elements introduced into the powder cake.

The ventilation may furthermore take place by means of ventilation bodies (700) created during the building process, such as illustrated in FIG. 7. According to the invention, cylindrical bodies which include bores are particularly preferred here. They are left in the build container after the building process. The bore is cleared with the aid of an extractor. A tube, which is connected to the extraction system, for example via a flexible hose, is placed above a predefined connecting piece. A radial flow (701) occurs within feedstock (602). According to the invention, the air supply channels may also be preferably created during the building process. This method variant is particularly suitable for evacuating and drying selected areas.

This method is also suitable for use in existing machines. Only the contacting and the underpressure device are needed as retrofits. There is no need to change the structure.

The underlying procedure may also be transferred to another embodiment of the invention.

According to the invention, the forced ventilation of feedstock (602) may take place via the build container base. The connection to the underpressure system, however, takes place through the building platform in the variant described above. In existing machines, this requires a certain amount of conversion work.

Figure 8:
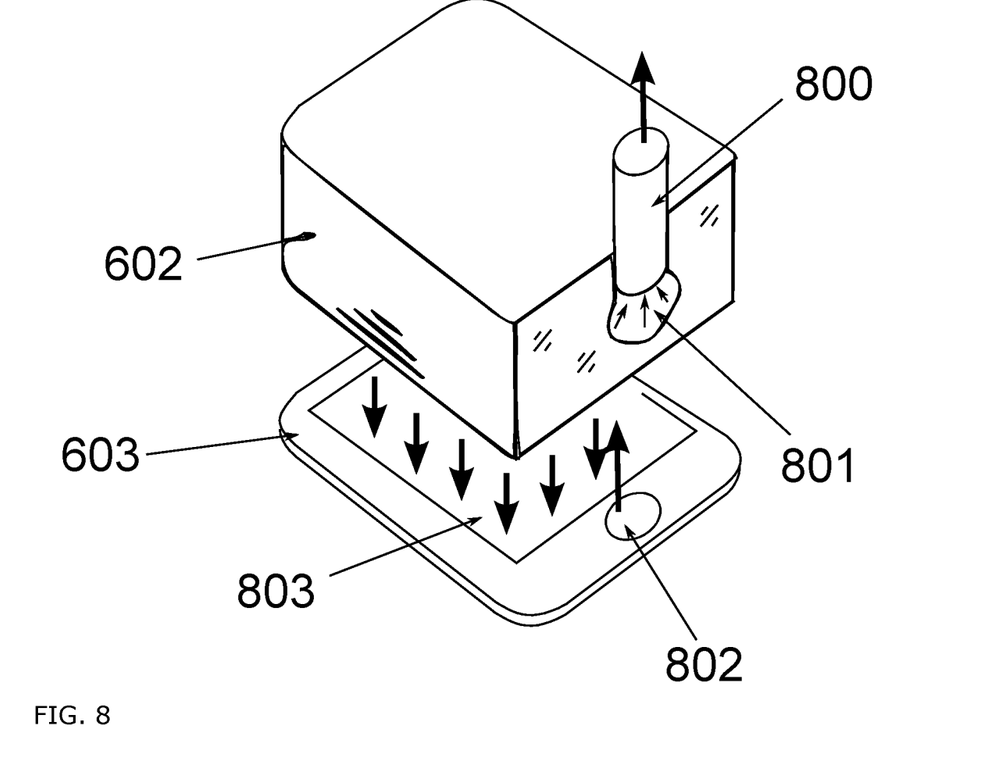
FIG. 8: shows the contacting of air conducting elements through the powder.
Figure 9:
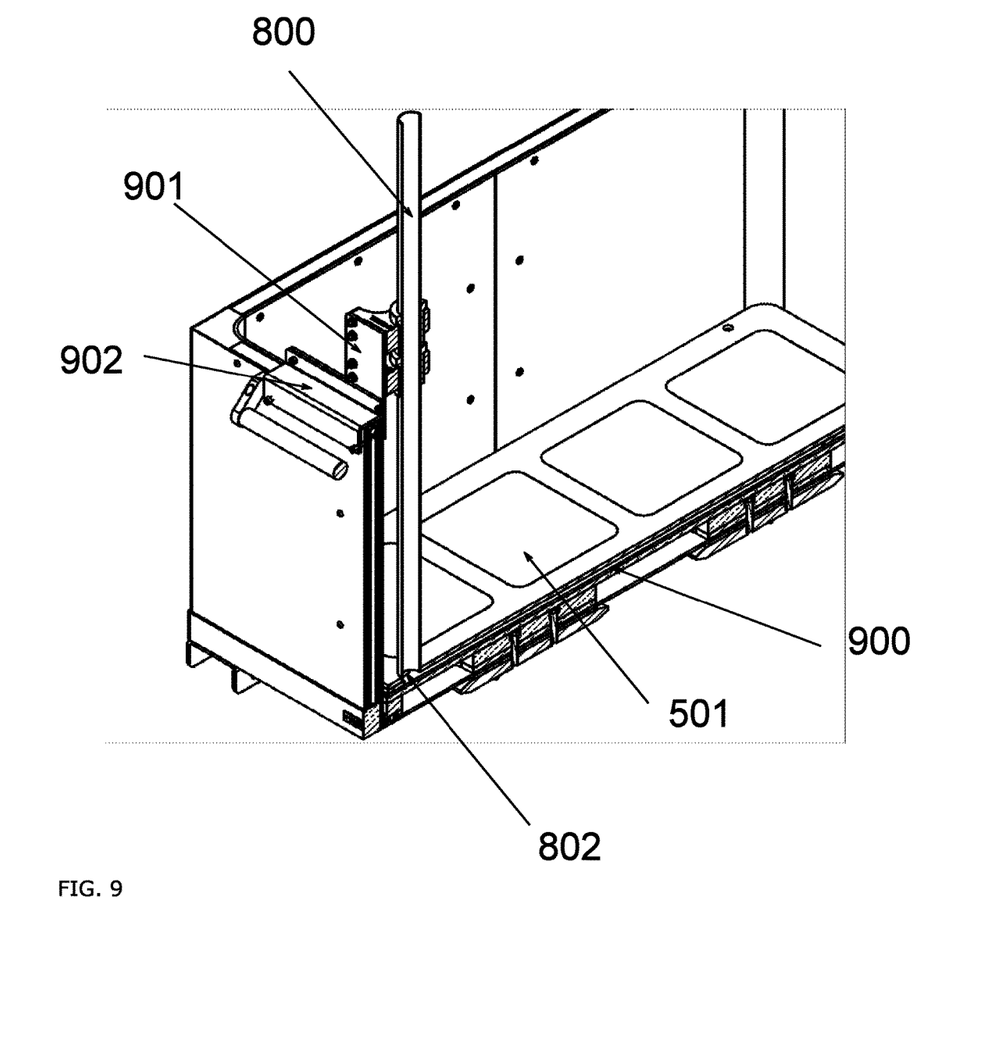
FIG. 9: shows an isometric view of a build container designed according to the invention.

However, building platform (102), including retention system (803), may also be connected to the underpressure system through the powder, as described above. For this purpose, a channel is sucked through the feedstock present after the building process with the aid of a suction pipe (powder cavity (801) represents an intermediate state). An exact guidance of this pipe makes it possible to safely strike contact point (802) with the suction pipe, such as illustrated in FIG. 8 and FIG. 9. The powder may be forced-ventilated through the suction pipe (800).

Within the building platform, a uniform underpressure is ensured in the powder by means of an air distribution geometry (900), such as illustrated in FIG. 9. The technical construction may take place as a sandwich design. Retention systems (501) are introduced into the layer facing the feedstock.

Figure 10:
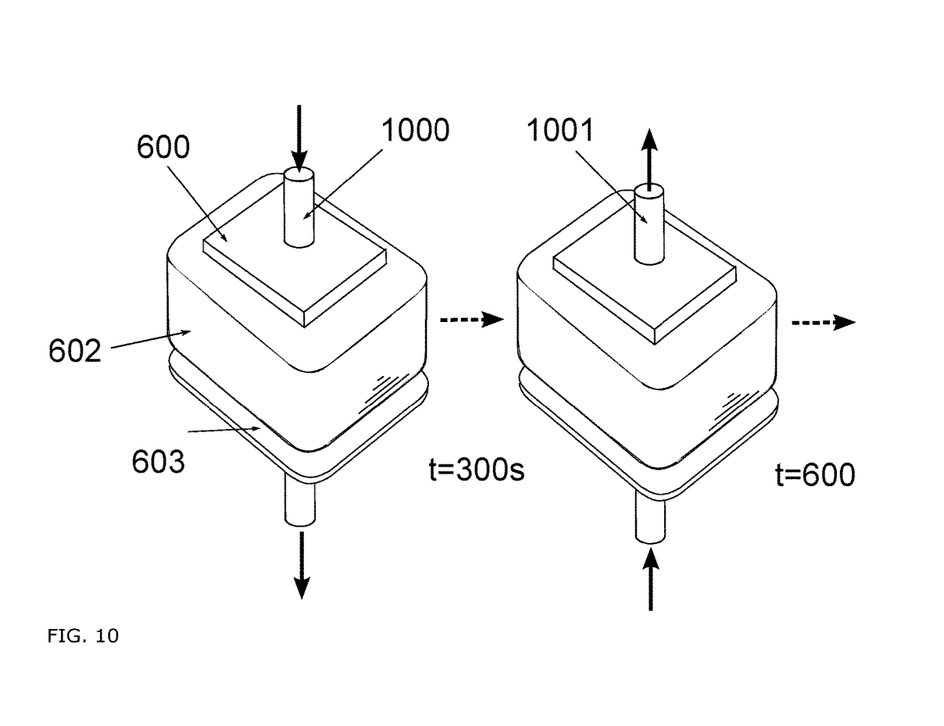
FIG. 10: shows the switching of the flow direction.

Another embodiment of the invention relates to the control system. Tests have shown that the forced ventilation causes a greater deposit buildup on one side of components (103). This forced ventilation is in the flow direction. If this property is not desired or technically disruptive, the forced ventilation may switch directions. For this purpose, extraction through the feedstock takes place in an interrupted manner, from above (1000) or from below (1001), such as illustrated in FIG. 10. For example, extraction cycles may each last for 5 minutes.

LIST OF REFERENCE NUMERALS

100 Print head
101 Coater
102 Building platform
103 Component
104 Build container
105 Print head path
106 Coater path
107 Powder layers
108 Direction of building platform movement
109 Dosed droplets
110 Powder roll
111 Build space boundary
112 Coater gap
113 Coater stock
200 IR emitter
300 Evaporating material in an open layer
301 Material evaporating into the powder
302 Possible vapor channel
303 Unbound particle
304 Bound particle
305 Geometric component limit
400 Flow direction of the forced ventilation through the geometric component
401 Flow direction of the forced ventilation outside the geometric component
402 Liquid binder
500 Particle accumulation 501 Retention system (sieve, porous body)
600 Controlled air flow (forced ventilation) through the cover surface of the feedstock
601 Forced ventilation through a side wall
602 Feedstock
603 Forced ventilation through the building platform
700 Printed and cleared ventilation body
701 Flow in the powder
800 Suction pipe
801 Powder cavity
802 Contact point with the building platform
803 Retention system on the building platform
900 Air distribution geometry
901 Pipe guide
902 Build container connection
1000 Controlled air flow (flow) through the powder cake from above
1001 Controlled air flow (flow) through the powder cake from below

What is claimed is:

1. A method for producing three-dimensional models by means of a layering technique, comprising the steps of:
   applying a particulate build material in a layer onto a build space, and then selectively applying a binder fluid to the particulate build material, and repeating these steps until a desired model is produced layer by layer,
   wherein the method includes a controlled air flow being conducted through the applied particulate build material after the desired model is produced layer by layer;
   wherein the binder fluid has a boiling point below a boiling point of distilled water.

2. The method according to claim 1, characterized in that the controlled air flow flows through the build material applied to the build space begins after the layers are applied.

3. The method of claim 1, wherein the controlled air flow flows through the build material counter to the direction of gravity.

4. A model produced according to a method according to claim 1.

5. A device for producing three-dimensional models according to the method of claim 1, wherein the device comprises:
   one or multiple means for producing a controlled air flow in a build material;
   wherein, the device includes an extractor for clearing a printed ventilation body in the build material or a suction pipe for forming an air flow channel in the build material.

6. A method for producing three-dimensional models by means of a layering technique, comprising steps of:
   applying a particulate build material in a layer onto a build space, and then selectively applying a binder fluid to the particulate build material, and repeating these steps until a desired model is produced layer by layer,
   wherein the method includes a controlled air flow being conducted through the applied particulate build material; and
   wherein the method includes a step of forming one or more ventilation bodies or one or more air channels in the applied particulate build material.

7. The method of claim 6, wherein the method includes the air flow flowing through the particulate build material to the air flow channel after the desired model is produced layer by layer.

8. A method for producing three-dimensional models by means of a layering technique, comprising the steps of:
   applying a particulate build material in a layer onto a build space, and then selectively applying a binder fluid to the particulate build material, and repeating these steps until a desired model is produced layer by layer,
   wherein the method includes a controlled air flow being conducted through the applied particulate build material after the desired model is produced layer by layer; and
   wherein a direction of the controlled air flow is changed during the method.

9. The method of claim 8, wherein the boiling point of the binder fluid is below a boiling point of distilled water.

10. A device for producing three-dimensional models by means of a layering technique comprising:
    one or multiple means for producing a controlled air flow in a build material;
    wherein a flow direction of the controlled air flow is changeable during the producing of the three-dimensional models.

11. The device of claim 10, wherein the device includes a component for heating the air flow before flowing through the build material.

12. The device of claim 11, wherein,
    the device includes a retention system having larger effective pores than the average grain size of the particulate build material.

13. The device according to claim 10, wherein the means for producing a controlled air flow includes one or multiple means for generating an overpressure or an underpressure, and
    the device includes a retention system having smaller effective pores than the average grain size of the particulate build material, wherein the retention system allows the controlled air flow to pass while trapping particles in the air flow.

14. The device of claim 13, wherein the material of the retention system is a screen mesh, a filter structure, an open-pore sintered material and/or a porous material.

15. The device of claim 10, wherein the device includes multiple means for generating a controlled air flow.

16. A method for producing three-dimensional models by means of a layering technique using the device of claim 11, the method comprising steps of:
    applying a particulate build material in a layer onto a build space, and then selectively applying a binder fluid to the particulate build material, and repeating these steps until a desired model is produced layer by layer,
    wherein the method includes a controlled air flow being conducted through the applied particulate build material;
    wherein the controlled air flow is heated before it enters the build material, and wherein the controlled air flow is produced by overpressure or by underpressure.

17. A method for producing three-dimensional models by means of a layering technique, comprising the steps of:
    applying a particulate build material in a layer onto a build space, and then selectively applying a binder fluid to the particulate build material, and repeating these steps until a desired model is produced layer by layer,
    wherein the method includes a controlled air flow being conducted through the applied particulate build material after the desired model is produced layer by layer; and
    wherein the controlled air flow flows through the build material via a plate placed on the build material.

18. The method of claim 17, wherein the controlled air flow essentially flows through the entire volume of the build material applied to the build space.

19. The method of claim 17, wherein the controlled air flow essentially selectively flows through the build material in the area of the upper build material layers.

20. A device for producing three-dimensional models by means of a layering technique comprising:
one or multiple means for producing a controlled air flow in a build material;
wherein the build material is in contact via a plate provided with an air flow means and placed on the build material.

21. The device of claim 20, wherein the device includes a component for heating the air flow before flowing through the build material.

22. A method for producing three-dimensional models by means of a layering technique using the device of claim 20, comprising the steps of:
applying a particulate build material in a layer onto a build space, and then selectively applying a binder fluid to the particulate build material, and repeating these steps until a desired model is produced layer by layer,
wherein the method includes placing a plate on the particulate build material and in contact with the particulate build material, and the method includes a controlled air flow being conducted through the particulate build material via the plate.

* * * * *